(12) United States Patent
Langholz

(10) Patent No.: US 11,536,943 B2
(45) Date of Patent: Dec. 27, 2022

(54) MICROSCOPE AND METHOD FOR GENERATING AN IMAGE PIECED TOGETHER FROM A PLURALITY OF INDIVIDUAL MICROSCOPE IMAGES

(71) Applicant: Carl Zeiss Microscopy GmbH, Jena (DE)

(72) Inventor: Nils Langholz, Apolda (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 94 days.

(21) Appl. No.: 17/321,568

(22) Filed: May 17, 2021

(65) Prior Publication Data

US 2021/0364775 A1    Nov. 25, 2021

(30) Foreign Application Priority Data

May 19, 2020    (DE) .......................... 102020113454.1

(51) Int. Cl.
| | | |
|---|---|---|
| G02B 21/36 | (2006.01) | |
| G02B 21/00 | (2006.01) | |
| G02B 21/26 | (2006.01) | |
| G02B 21/24 | (2006.01) | |
| G03B 37/02 | (2021.01) | |
| G03B 37/04 | (2021.01) | |
| G06T 5/00 | (2006.01) | |

(52) U.S. Cl.
CPC ......... *G02B 21/367* (2013.01); *G02B 21/008* (2013.01); *G02B 21/26* (2013.01)

(58) Field of Classification Search
None
See application file for complete search history.

(56) References Cited

U.S. PATENT DOCUMENTS

| | | | |
|---|---|---|---|
| 2013/0215263 A1 | 8/2013 | Ariga | |
| 2014/0362205 A1 | 12/2014 | Sasaki | |
| 2017/0161930 A1* | 6/2017 | Kakemizu | ............... G06T 11/60 |

FOREIGN PATENT DOCUMENTS

| | | |
|---|---|---|
| DE | 10005852 | 8/2001 |
| DE | 102013006994 | 4/2013 |
| DE | 102018104704 | 9/2019 |
| EP | 2596474 | 2/2013 |
| EP | 3156967 A1 | 4/2017 |
| WO | 2018/147888 A1 | 8/2018 |

* cited by examiner

*Primary Examiner* — Christopher Braniff

(74) *Attorney, Agent, or Firm* — Mayer & Williams, PC; Stuart Mayer

(57) ABSTRACT

The present invention initially relates to a method for generating an image of a sample, said image being pieced together from a plurality of individual microscope images. A microscope is provided, for which a measurement value of a twist angle ($\delta$) present between an image recording unit of the microscope and an object stage of the microscope and a measurement accuracy of this measurement value are known. There is a recording of a first individual microscope image of the sample using the microscope and a displacement of the image recording unit and the sample-supporting object stage relative to one another, whereupon a second individual microscope image (02) of the sample is recorded using the microscope. A search region is determined in the second or first individual microscope image, an overlap region between the individual microscope images being expected in said search region.

10 Claims, 1 Drawing Sheet

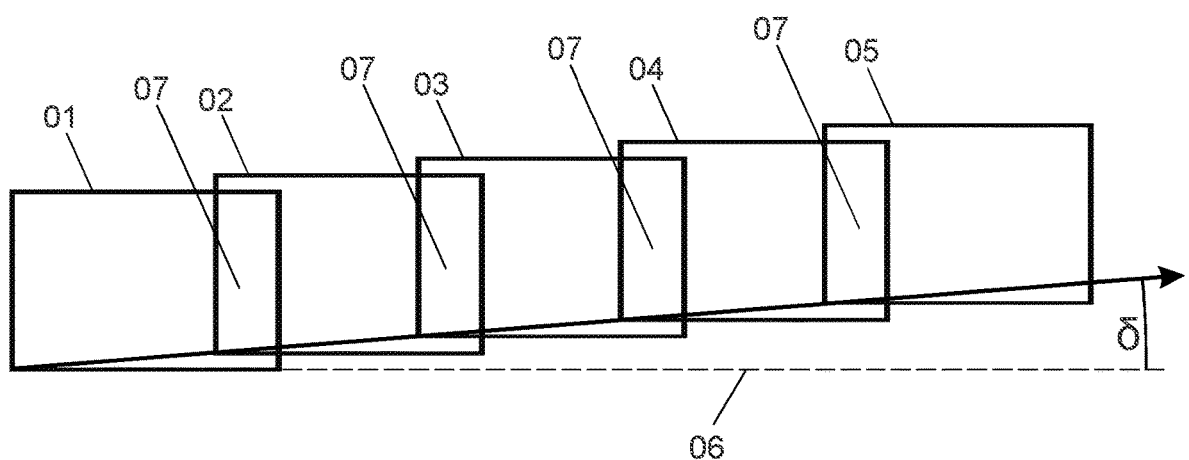

MICROSCOPE AND METHOD FOR GENERATING AN IMAGE PIECED TOGETHER FROM A PLURALITY OF INDIVIDUAL MICROSCOPE IMAGES

BACKGROUND OF THE INVENTION

The present invention initially relates to a method for generating an image of a sample, said image being pieced together from a plurality of individual microscope images. The individual microscope images of the sample are recorded in order to be pieced together by stitching such that a microscope image of the sample that images at least a larger part of the sample is obtained. Furthermore, the invention relates to a microscope suitable to this end.

DE 100 05 852 C2 discloses a method for producing height images of technical surfaces with microscopic resolution. After measuring a sample region, the sample is displaced in an XY-plane perpendicular to the optical axis of the measurement microscope such that an adjacent sample region can be measured, and a pieced together image of the sample surface structure is obtained by electronic juxtaposition of, i.e., by stitching, the measurement results of the respective adjacent regions.

EP 3 156 967 B1 discloses a method for creating a panoramic microscopy representation, in which a first and a second microscope recording are pieced together taking account of alteration information. To this end, a movement vector which describes the lateral displacement in the x- and/or y-direction is ascertained.

EP 2 596 472 B1 has disclosed a method for generating a mosaic recording of a sample on an object stage. Offset vectors are ascertained between pairs of mutually overlapping partial images by way of a similarity analysis of the overlapping partial images. An optimization problem for finding an optimal set of recording position variables for the partial images for minimizing a measure of a deviation between the offset vectors of the pairs of mutually overlapping partial images on the one hand and differences in the recording position variables of the pairs of mutually overlapping partial images on the other hand should be solved while observing a constraint for the recording position variables.

DE 10 2013 006 994 A1 teaches a method for optimizing a workflow in a digital microscope. The digital microscope comprises at least one monitoring sensor for observing a sample, a sample stage, an optical unit, or a user and comprises a monitoring unit. Observation data of the monitoring sensor are captured and automatically analyzed and evaluated in the monitoring unit in order to generate control data and in order to use the latter to control the workflow of the digital microscope. An overview image or total image can be generated by juxtaposition of, i.e., by stitching, a plurality of microscope recordings.

DE 10 2018 104 704 A1 discloses a method for altering a magnification of a digital microscope which has at least two automatically exchangeable objective lenses with different imaging scales, one objective lens thereof being selected in each case. A magnification of an image output by the microscope is altered continuously, for the purposes of which a magnification of an image that was recorded with the selected objective lens and converted by an image converter is altered continuously by way of digital image processing. By way of example, a microscope stage can be displaced in a y-direction. In the process, sensor-equivalent image fields in a sensor image plane are recorded and pieced together by stitching along the displacement path of the microscope stage.

The above-described solutions use stitching to piece together microscope images which are displaced with respect to one another. However, the displacement is not known exactly in practice, for example because a displaceable sample stage has mechanical tolerances along the displacement path. Consequently, the deviation between a theoretical position following the displacement and the actual real position following the displacement should be determined and corrected for the stitching. To this end, the content of the microscopic images in an overlap region are used, and tests are carried out in respect of which assumed displacement leads to the maximum correspondence. A search is carried out within a search space or search region in the microscope images. This search region must be large enough to comprise the actual real position. However, the microscope images of the sample might have ambiguities or instances of self-similarity, for example in the case of regularly repeating structures such as grid structures, as a result of which the determination of the actual real position of the displacement according to the process described is susceptible to errors.

SUMMARY OF THE INVENTION

The object of the present invention consists of reducing the susceptibility of stitching of individual microscope images to errors, using the prior art as a starting point.

The specified object is achieved by a method in accordance with attached claim 1 and by a microscope in accordance with attached alternative independent claim 10.

The method according to the invention serves to generate an image of a sample which was pieced together from a plurality of individual microscope images. The pieced together microscopic image images at least a larger part of the sample. By way of example, the pieced together microscopic image can image the entire sample. The pieced together microscopic image might also be a panoramic image of the sample.

A microscope is provided, for which a measurement value of a twist angle present between an image recording unit of the microscope and an object stage of the microscope and a measurement accuracy of this measurement value are known. By way of example, the image recording unit can be a camera or a unit made of a camera and an objective lens of the microscope. The image recording unit might also be a laser scanning unit, for example. The microscope might also be a confocal microscope, a wide field microscope, a white light interferometer, or a light sheet microscope. The object stage serves to arrange the sample thereon. The twist angle is preferably formed in relation to an optical axis. The optical axis is preferably aligned perpendicular to a plane in which the object stage is located. The measurement accuracy should be understood to be the measurement uncertainty of the measurement of the twist angle. The measurement accuracy or the measurement uncertainty specifies a value range within which the true value of the twist angle is located with a certain probability, for example 95%. The measurement value of the twist angle and its measurement accuracy are known, in particular, by virtue of the fact that the twist angle is measured and the measurement accuracy of the method for measuring the twist angle is captured. In an ideal case, the twist angle preferably equals zero, i.e., the twist angle is an unwanted twist between the image recording unit and the object stage. The twist angle is only a few degrees in many microscopes. The twist angle is preferably no more than ±5°, particularly preferably no more than ±2°. This applies accordingly to the measurement value of the twist angle. The measurement accuracy of the measurement value or the measurement uncertainty is preferably no more than ±0.2°, further preferably no more than ±0.1°, and particularly preferably no more than ±0.05°.

In a further step of the method according to the invention, a first individual microscope image of the sample is recorded by the microscope. Here, the sample is arranged on the object stage.

In a further step of the method according to the invention, the image recording unit and the sample-supporting object stage are displaced relative to one another. This displacement is preferably implemented in a plane parallel to an image plane, which is preferably parallel to the plane comprising the object stage and which is preferably perpendicular to the optical axis. The object stage is preferably displaced while the image recording unit is at rest. The displacement is preferably implemented in a direction perpendicular to the optical axis in a horizontal direction in relation to the individual microscope images. As an alternative or in addition thereto, the displacement is preferably implemented in a direction perpendicular to the optical axis in a vertical direction in relation to the individual microscope images. As an alternative or in addition thereto, this displacement is preferably implemented by way of a rotational movement about one of the three spatial directions or about a free direction. The image recording unit and the object stage are displaced relative to one another so that the image recording unit is directed at a different part of the sample. The sample is preferably at rest on the object stage while the image recording unit and the object stage are displaced relative to one another. In principle, there can also be a displacement between the image recording unit and the sample, with this displacement not being caused by the object stage.

Once the image recording unit and the sample-supporting object stage have been displaced relative to one another, a second individual microscope image of the sample is recorded using the microscope. The first individual microscope image and the second individual microscope image image different regions of the sample, there being, however, an intersection such that a smaller part of the sample is imaged by the first individual microscope image and the second individual microscope image. This intersection represents an overlap region between the first individual microscope image and the second individual microscope image.

A search region is determined in the second individual microscope image or in the first individual microscope image in a further step of the method according to the invention, the overlap region between the first individual microscope image and the second individual microscope image being expected in said search region. The search region can also be referred to as a search space and is preferably two-dimensional. The search region is part of the second individual microscope image and of the first individual microscope image. According to the invention, the search region is determined using the measurement value of the twist angle and its measurement accuracy as a starting point. Thus, the search region is chosen such that the measurement accuracy of the twist angle has been taken into account, and so a deviation of the measurement value from the actual value of the twist angle within the measurement accuracy does not lead to the search region not comprising the actual overlap region.

In a further step of the method according to the invention, the overlap region between the first individual microscope image and the second individual microscope image is searched for within the search region. Since the overlap region is ensured to be situated within the search region, at least this condition that the overlap region can be uniquely found is satisfied. To search for the overlap region, it is possible to use data which describe a topography of the respective individual microscope image, grayscale values of the respective individual microscope image or camera image and/or color values such as, e.g., RGB color values of the respective individual microscope image or camera image.

In a further step of the method according to the invention, there is a piecing together of the first individual microscope image and the second individual microscope image to form a pieced together image of the sample using the ascertained overlap region as a starting point. Since the overlap region was ascertained in advance, the actual relative position of the two individual microscope images with respect to one another is known. They are linked in accordance with this relative position, from which the pieced together image of the sample arises. This piecing together of the first individual microscope image and the second individual microscope image represents stitching. Stitching can be carried out as 2D stitching, as 2D stitching with height matching, as 3D stitching and/or as stitching with rotational fitting.

A particular advantage of the method according to the invention consists of the use of the measurement value of the twist angle allowing the search region to be significantly reduced in size in comparison with the prior art. According to the prior art, the search region should be dimensioned according to the admissible tolerance of the twist between the image recording unit and the object stage. This tolerance is ±2°, for example. By way of example, if the individual microscope images have dimensions of 1600 pixels by 1200 pixels, the search region must be at least ±(sin 2°·1600 pixels)=±56 pixels long. However, according to the invention it is necessary to take account of the significantly smaller measurement accuracy or measurement uncertainty. By way of example, the latter is ±0.07°, and so the search region only still needs to be at least ±(sin 0.07°·1600 pixels)=±2 pixels long. The significantly smaller search region leads to the overlap region being correctly found with a significantly higher probability. The significantly smaller search region also leads to a reduction in ambiguities in the search region; for example, to less than 10% in comparison with the prior art. The significantly smaller search region also leads to a reduction in step functions; for example, to less than 10% in comparison with the prior art. If the design-to-cost (DTC) variable is known, it can be tolerated to be more approximate. If a plurality of individual microscope images are pieced together, it is possible to dispense with stitching if the search for the overlap region was unsuccessful for individual pairs of successive individual microscope images. Instead, these pairs of two successive individual microscope images are pieced together in accordance with the measured displacement while considering the measurement value of the twist angle. Since the twist angle has already been captured, the remaining deviation is only still given on account of the restricted measurement accuracy and, as a rule, it is very small, and so the piecing together in accordance with the measured displacement while considering the measurement value of the twist angle often leads to a sufficiently good result. A further particular advantage of the method according to the invention consists in the fact that it usually requires no additional outlay in comparison with the prior art since the measurement value of the twist angle and its measurement accuracy is known anyway in many cases.

BRIEF DESCRIPTION OF THE DRAWING

FIG. 1 shows five individual microscope images 01, 02, 03, 04, 05 of a sample (not shown here), which were recorded using a microscope (not shown here).

DETAILED DESCRIPTION OF THE INVENTION

In preferred embodiments of the method according to the invention, it is not only two individual microscope images that are recorded but more, and these are finally pieced together to form the pieced together image of the sample. The image recording unit and the object stage are displaced relative to one another in each case between the recordings of the further individual microscope images. A further search region is respectively determined in one of two successively recorded individual microscope images. A further overlap region between these two successively recorded further individual microscope images is expected in this further search region. The further search region is determined using the measurement value of the twist angle and its measurement accuracy as a starting point. The further overlap region between these two successively recorded further individual microscope images is searched for within the further search region. There is a piecing together of the first individual microscope image, the second individual microscope image and the further individual microscope images to form the pieced together image of the sample using the ascertained overlap regions as a starting point.

The individual microscope images are two-dimensional in preferred embodiments of the method according to the invention. They extend in an x-direction and in a y-direction perpendicular to the x-direction. The extent of the respective microscopic image in the x-direction can be referred to as the length of the respective microscope image. The extent of the respective microscopic image in the y-direction can be referred to as the width of the respective microscope image. The x-direction can be referred to as horizontal in relation to the respective microscope image. The y-direction can be referred to as vertical in relation to the respective microscope image.

In preferred embodiments of the method according to the invention, a length of the search region in the y-direction is defined in pixels when determining the search region. This extent in the y-direction can also be referred to as the height of the search region. The extent of the search region in the y-direction is determined using a product of a sine of the measurement accuracy of the measurement value of the twist angle and a length of the respective individual microscope image in pixels in the x-direction as a starting point. By way of example, if the measurement accuracy is ±0.14° and the length of the respective individual microscope image in the x-direction is 1600 pixels, the extent of the search region in the y-direction is determined using a measure ±(sin 0.14°·1600 pixels)=±4 pixels as a starting point. Accordingly, the extent of the search region in the y-direction is at least ±4 pixels.

The length of the search region in the y-direction in pixels is preferably formed by a sum of a plurality of terms. A first of the terms is the above-described product of the sine of the measurement accuracy of the measurement value of the twist angle and the length of the respective individual microscope image in pixels in the x-direction. A second of the terms is a number of pixels for taking account of stochastic errors. In the aforementioned example with the measurement accuracy of ±0.14° and the length of the respective individual microscope image in the x-direction of 1600 pixels, the first term equals ±4 pixels. By way of example, the second term is ±1 pixel. Accordingly, the length of the search region in the y-direction is set to ±(4+1)=±5 pixels. In principle, that could be a further term which is set by an operator.

In preferred embodiments of the method according to the invention, the length of the search region in the y-direction is no more than ±10 pixels if the length of the respective individual microscope image is at least 1000 pixels and preferably at least 1600 pixels in the x-direction. In further preferred embodiments of the method according to the invention, the length of the search region in the y-direction is no more than ±5 pixels if the length of the respective individual microscope image is at least 1000 pixels and preferably at least 1600 pixels in the x-direction. In particularly preferred embodiments of the method according to the invention, the length of the search region in the y-direction is no more than ±2 pixels if the length of the respective individual microscope image is at least 1000 pixels and preferably at least 1600 pixels in the x-direction.

In preferred embodiments of the method according to the invention, the individual microscope images are preprocessed before the overlap region is searched for. This preprocessing serves to optimize the individual microscope images and preferably comprises a shading correction, a distortion correction, a field curvature correction, and/or a white balance. There preferably is post-processing of the pieced together image. This post-processing preferably comprises blending.

In preferred embodiments of the method according to the invention, the displacement is measured when displacing the image recording unit and the object stage relative to one another, in order to determine a target position of the overlap region. Then, the overlap region would in fact be situated at the target position if the twist angle were to equal zero and there were no other errors either. The target position of the overlap region is used to determine a position of the search region. In particular, the displacement in the x-direction is measured. This is the displacement that occurred between the recordings of two successive individual microscope images. The measurement is preferably implemented by a sensor at the object stage to be displaced or by evaluating the individual microscope images, for example by counting pixels during the displacement.

Moreover, to determine the position of the search region in the respective individual microscope image, a product of a sine of the measurement value of the twist angle and the measured displacement in pixels is preferably taken into account. This product specifies how far away the target position of the overlap region would be from the actual position of the overlap region if the measurement value of the twist angle were exact and there were no other errors either.

The position of the search region is preferably determined from the sum of the terms, with one of the terms representing the ascertained target position of the overlap region and a further term representing the product of the sine of the measurement value of the twist angle and the measured displacement.

For the purposes of providing the microscope, the twist angle is measured with the obtainable measurement accuracy in order to obtain the measurement value of the twist angle in preferred embodiments of the method according to the invention. This is preferably implemented when the microscope is produced, when the microscope is delivered, and/or when the microscope is put into use for the first time. This measurement is preferably also taken when the microscope is serviced. As a rule, it is not necessary to carry out this measurement of the twist angle before each use of the microscope, i.e., before each generation of an image of a sample that was pieced together from a plurality of individual microscope images. However, the twist angle can be measured immediately before such a generation of a pieced together image in special embodiments.

The microscope according to the invention comprises an object stage for supporting a sample to be examined by microscopy and an image recording unit for recording microscope images of the sample. The microscope preferably comprises an objective lens for imaging the sample in the image recording unit. The image recording unit preferably comprises an image sensor for converting the image that is imaged directly or indirectly by the objective onto the image sensor into an electrical signal.

The image recording unit and the object stage are displaceable relative to one another. A measurement value of a twist angle present between the image recording unit and the object stage is given, i.e., known, with a measurement accuracy for this measurement value.

The microscope according to the invention furthermore comprises a microscope control and image processing unit, which is configured to carry out a plurality of steps. A first individual microscope image of the sample is recorded in one step. In a further step, there is a recording of a second individual microscope image of the sample after the image recording unit and the sample-supporting object stage were displaced relative to one another. A search region is determined in the second individual microscope image or in the first individual microscope image in a further step, an overlap region between the first individual microscope image and the second individual microscope image being expected in said search region. The search region is determined using the measurement value of the twist angle and its measurement accuracy as a starting point. The overlap region between the first individual microscope image and the second individual microscope image is searched for within the search region determined previously. Furthermore, there is a piecing together of the first individual microscope image and the second individual microscope image to form a pieced together image of the sample using the ascertained overlap region as a starting point.

The microscope control and image processing unit is preferably also configured to carry out steps which have been described for the method according to the invention and its preferred embodiments. The microscope according to the invention preferably also has features which have been described in conjunction with the method according to the invention.

Further details and developments of the invention will become apparent from the following description of a preferred embodiment of the invention, with reference being made to the drawing.

FIG. 1 illustrates five individual microscope images 01, 02, 03, 04, 05 of a sample (not shown here), which were recorded using a microscope (not shown here) in accordance with a preferred embodiment of a method according to the invention. Between the recordings of the five individual microscope images 01, 02, 03, 04, 05, an object stage (not shown here) was displaced in a horizontal direction 06 in relation to the individual microscope images 01, 02, 03, 04, 05 in order to be able to piece together the five individual microscope images 01, 02, 03, 04, 05 to form an image which is an image representation of a larger part of the sample (not shown here).

On account of manufacturing with finite accuracy, the object stage (not shown here) is slightly twisted in relation to an image recording unit (not shown here), and so the five individual microscope images 01, 02, 03, 04, 05 do not lie exactly next to one another in the horizontal direction, the illustration in the figure being excessive for clarity, since a twist angle $\delta$ with respect to the horizontal direction 06 is typically no more than 2°, for example. According to the invention, a known measurement value of this twist angle and measurement accuracy of this twist angle are used to significantly restrict a search region for finding overlap regions 07 between the individual microscope images 01, 02, 03, 04, 05.

LIST OF REFERENCE SIGNS

01 First individual microscope image
02 Second individual microscope image
03 Third individual microscope image
04 Fourth individual microscope image
05 Fifth individual microscope image
06 Horizontal direction
07 Overlap region
$\delta$ Twist angle

The invention claimed is:

1. A method for generating an image of a sample, said image being pieced together from a plurality of individual microscope images (01, 02, 03, 04, 05), comprising the following steps:
   providing a microscope for which a measurement value of a twist angle ($\delta$) present between an image recording unit of the microscope and an object stage of the microscope and a measurement accuracy of this measurement value are known;
   recording a first individual microscope image (01) of the sample using the microscope;
   displacing the image recording unit and the sample-supporting object stage relative to one another;
   recording a second individual microscope image (02) of the sample using the microscope;
   determining a search region in the second individual microscope image (02) or in the first individual microscope image (01), an overlap region between the first individual microscope image (01) and the second individual microscope image (02) being expected in said search region, with the search region being determined using the measurement value of the twist angle ($\delta$) and its measurement accuracy as a starting point;
   searching for the overlap region (07) between the first individual microscope image (01) and the second individual microscope image (02) within the search region; and
   piecing together the first individual microscope image (01) and the second individual microscope image (02) to form a pieced together image of the sample using the ascertained overlap region (07) as a starting point.

2. The method as claimed in claim 1, wherein further individual microscope images (03, 04, 05) are recorded, the image recording unit and the object stage being displaced relative to one another in each case between the recordings of the further individual microscope images (03, 04, 05), a further search region being respectively determined in one of two successively recorded further individual microscope images (03, 04, 05), a further overlap region (07) between these two successively recorded further individual microscope images (03, 04, 05) being expected in said further search region, the further search region being determined using the measurement value of the twist angle ($\delta$) and its measurement accuracy as a starting point; the further overlap region (07) between these two successively recorded further individual microscope images (03, 04, 05) being searched for within the further search region and piecing together of the first individual microscope image (01), the second individual microscope image (02) and the further individual microscope images (03, 04, 05) to form the pieced together image of the sample being implemented using the ascertained overlap regions (07) as a starting point.

3. The method as claimed in claim 1, wherein the individual microscope images (01, 02, 03, 04, 05) extend in an x-direction (06) and in a y-direction perpendicular to the x-direction (6), a length of the search region in the y-direction being defined in pixels when determining the search region, said length being determined using a product of a sine of the measurement accuracy of the measurement value of the twist angle ($\delta$) and a length of the respective individual microscope image (01, 02, 03, 04, 05) in pixels in the x-direction as a starting point.

4. The method as claimed in claim 3, wherein the length of the search region in the y-direction in pixels is formed by a sum of a plurality of terms, a first of the terms being the product of the sine of the measurement accuracy of the measurement value of the twist angle ($\delta$) and the length of the respective individual microscope image (01, 02, 03, 04, 05) in pixels in the x-direction and a second of the terms being a number of pixels for taking account of stochastic errors.

5. The method as claimed in claim 3, wherein a length of the search region in the y-direction is no more than ±10 pixels if the length of the respective individual microscope image (01, 02, 03, 04, 05) in the x-direction is at least 1000 pixels.

6. The method as claimed in claim 1, wherein the displacement is measured when displacing the image recording unit and the object stage relative to one another, in order to determine a target position of the overlap region (07) which is used to determine a position of the search region.

7. The method as claimed in claim 6, wherein a product of a sine of the measurement value of the twist angle ($\delta$) and the measured displacement is furthermore used to determine the position of the search region in the respective individual microscope image (01, 02, 03, 04, 05).

8. The method as claimed in claim 7, wherein the position of the search region is determined from a sum of the target position of the overlap region (07) and the product of the sine of the measurement value of the twist angle ($\delta$) and the measured displacement.

9. The method as claimed in claim 1, wherein, for the purposes of providing the microscope, the twist angle ($\delta$) is measured with the measurement accuracy in order to obtain the measurement value of the twist angle ($\delta$).

10. A microscope comprising:
   an object stage for supporting a sample to be examined by microscopy;
   an image recording unit for recording microscope images of the sample, the image recording unit and the object stage being displaceable relative to one another and a measurement value of a twist angle ($\delta$) present between the image recording unit and the object stage being given with a measurement accuracy; and
   a microscope control and image processing unit, which is configured to carry out the following steps:
   recording a first individual microscope image (01) of the sample;
   recording a second individual microscope image (02) of the sample after the image recording unit and the sample-supporting object stage were displaced relative to one another;
   determining a search region in the second individual microscope image (02) or in the first individual microscope image (01), an overlap region (07) between the first individual microscope image (01) and the second individual microscope image (02) being expected in said search region, with the search region being determined using the measurement value of the twist angle ($\delta$) and its measurement accuracy as a starting point;
   searching for the overlap region (07) between the first individual microscope image (01) and the second individual microscope image (02) within the search region; and
   piecing together the first individual microscope image (01) and the second individual microscope image (02) to form a pieced together image of the sample using the ascertained overlap region (07) as a starting point.

* * * * *